Nov. 10, 1970 T. LI 3,540,035

DIGITAL-TO-ANALOG CONVERTER EMPLOYING PROPAGATING DOMAINS

Filed July 12, 1968 5 Sheets-Sheet 1

INVENTOR
T. LI
BY
Wilford L. Wisner
ATTORNEY

WEIGHTED PULSE TRAIN

BALANCING PULSES FROM REFERENCE BULK EFFECT DEVICE

INTEGRATED PULSE TRAIN

SMOOTHED ANALOG SIGNAL

FIG. 5A WEIGHTED PULSE TRAIN
FIG. 5B BALANCING PULSES FROM REFERENCE BULK EFFECT DEVICE
FIG. 5C INTEGRATED PULSE TRAIN
FIG. 5D SMOOTHED ANALOG SIGNAL (ENLARGED SCALE)

United States Patent Office 3,540,035

Patented Nov. 10, 1970

3,540,035

DIGITAL-TO-ANALOG CONVERTER EMPLOYING PROPAGATING DOMAINS

Tingye Li, Middletown, N.J., assignor to Bell Telephone Laboratories, Incorporated, Murray Hill and Berkeley Heights, N.J., a corporation of New York Filed July 12, 1968, Ser. No. 744,417
Int. Cl. H03k 13/02
U.S. Cl. 340—347 8 Claims

ABSTRACT OF THE DISCLOSURE

In the digital-to-analog converter disclosed, the digital information bits of a word are temporarily stored and fed into a plurality of output signal paths substantially simultaneously and are then read out by a traveling domain apparatus and integrated to produce a sequence of amplitude modulated pulses each representative of a digital information word. The traveling domain apparatus illustratively includes a multiple-valley semiconductive body to which the respective signal paths are coupled to shunt current around the propagating domain in direct proportion to a predetermined weighting for the respective signal paths as well as in response to the digital information bits. Integration of the weighted pulses representing the respective bits is illustratively achieved by a resistive-capacitive network coupled to the semiconductive body to integrate the current flow therethrough.

BACKGROUND OF THE INVENTION

This invention relates to digital-to-analog converters.

The development of increasingly high processing speeds in modern digital computers has created a need for new technology which is inherently capable of high-speed operation. I have recognized that there is, in particular, a need for the application of new and advanced technology in the area of digital-to-analog converters because such conversion not only involves logic operation but necessarily requires some technique for rapidly reading out a series of weighted pulses representing respective digital information bits of a digital information word.

In a computer or a digital transmission system, the information bits are digital signals reduced to the simplest possible components, for example, binary signals. A digital information word is a succession of bits which represent a single datum with respect to the output signals desired. For example, a continuous signal, commonly called an analog signal, can be sampled at spaced time intervals and represented by a succession of amplitude modulated pulses each of which can be called a "word" and in turn represented by a combination of a plurality of binary bits. As a specific example, in a system employing three bits per word the respective bits can have a predetermined weighting relative to one another of one, two, and four, according to a predetermined sequence of their appearance in the apparatus. By adding together these weighted values, one obtains the value of the pulse which represents a single datum as described above.

Increased processing speed could be achieved by a more rapid technique for reading out a succession of weighted pulses representative of the binary bits. Indeed, integration of these pulses could be greatly simplified if the reading-out process can be made fast enough.

SUMMARY OF THE INVENTION

According to my invention, I have recognized that the rapidly developing technology employing multiple-valley semiconductive devices, such as Gunn-effect devices, provides a highly advantageous technique for reading out the weighted pulses in a digital-to-analog converter.

In a specific embodiment of a digital-to-analog converter according to my invention, digital information bits representative of a word are temporarily stored and then directed substantially simultaneously into respective ones of a plurality of output paths from which they are read out with appropriate weighting by a traveling domain apparatus including a body of material in which electromagnetic field domains can be propagated.

According to specific features of my invention, appropriate weighting of the respective bits can be achieved either by weighting resistors in the signal paths or by appropriate variation of the properties of the traveling domain device in the portions to which the signal paths are coupled. For example, when the traveling domain device is a body of a multiple-valley semiconductive material, the cross-sectional area of the device is the property which is varied from one portion to another, inasmuch as the electric field strength of a traveling electric field domain is inversely related to the cross-sectional area of the body through which it is propagating.

BRIEF DESCRIPTION OF THE DRAWING

Other features and advantages of my invention will become apparent from the following detailed description, taken together with the drawing, in which:

FIGS. 5A through 5D show curves that are useful in explaining the theory and operation of the embodiments of FIGS. 3 and 4.

DESCRIPTION OF ILLUSTRATIVE EMBODIMENTS

Figure 1:
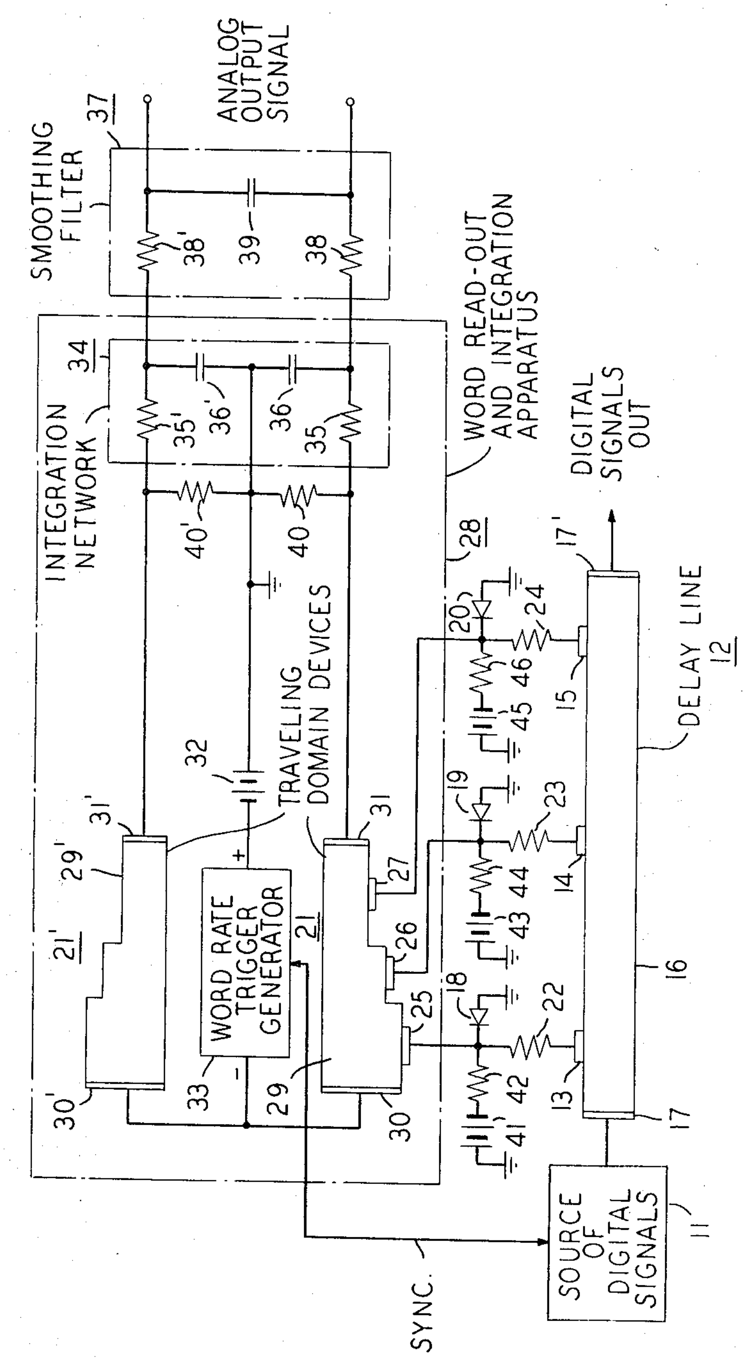
FIG. 1 is a partially schematic and partially block diagrammatic illustration of a first embodiment of my invention.

In the illustrative embodiment of FIG. 1, digital information signals are supplied from a source 11 in the form of a time sequence of groups of sequential digital information bits, each group representing a digital information word. For example, the source 11 could be a digital computer or could be the receiving terminal of a pulse-code-modulation (PCM) communication system. These signals are applied to a delay line 12 in which they are temporarily stored as they propagate therethrough so that the bits of a word may be directed substantially simultaneously through the taps 13, 14 and 15 into the corresponding output signal paths coupled to traveling domain device 21. It should be apparent that the transmit time of the bits between the centers of the delay line taps should be equal to the center-to-center separation of the bits in time. The termination of the signal paths upon resistive contacts 25, 26 and 27 comprise the input of the word read-out and integration apparatus 28. Apparatus 28 includes the traveling domain device 21 and its twin device 21' in a balanced arrangement.

The traveling domain devices 21 and 21' include multiple-valley semiconductive crystals 29 and 29', respectively, illustratively n-type gallium arsenide having a charge carrier concentration of $5 \times 10^{14}$ per cubic centimeter. The devices 21 and 21' further include means for nucleating and propagating electric field domains. This nucleating and propagating means comprises the electrodes 30 cathode and 31 anode attached to opposite ends of the crystal 29 and cathode 30' and anode 31' attached to crystal 29' and the biasing source 32 and trigger generator 33 connected in the common path of the balanced arrangement. The bias source 32 has a value greater than one-half the threshold, or nucleating, voltage in crystals 29 and 29' and serves primarily to propagate the domain after it has been nucleated. The word rate trigger generator 33 (33') is adapted to supply a sharp pulse voltage, greater than one-half threshold voltage, of the same polarity as the voltage of source 32 and of width greater than 100 picoseconds ($10^{-9}$ sec.), so that it has sufficient energy to nucleate traveling domains in crystals 29 and 29'. The common indicated polarity of sources 32 and 33 makes the electrodes 30 and 30' to be cathodes.

The signals are illustratively applied to the active medium of the delay line, illustratively a crystal 16, through an appropriate electro-acoustic transducer 17; and, correspondingly, the taps 13, 14 and 15 may be electro-acoustic transducers of types known in the art. The nonreflective termination 17' may be another electro-acoustic transducer.

The output signal paths illustratively comprise the resistors 22, 23 and 24 which are respectively connected between taps 13, 14 and 15 at delay line 12 and resistive contacts 25, 26 and 27 at positions of respectively different cross-sectional area of traveling domain device 21 in word readout and integration appartus 28. Diodes 18, 19 and 20 have their anodes connected to ground and their cathodes connected to resistive contacts 25, 26 and 27, respectively. They load the traveling domain device 21 except when a digital information bit is present at the corresponding tap of delay line 12. To accomplish this effect, diodes 18, 19 and 20 are forward-biased by the respective series circuits including battery 41 and resistor 42, battery 43 and resistor 44, battery 45 and resistor 46.

The traveling domain devices 21 and 21' are connected in a balanced arrangement with cathodes 30 and 30' connected together to a center tap of the output circuit, and anodes 31 and 31' respectively connected to the balancing terminals of load resistors 40 and 40'. The common terminal of 40 and 40' is connected to ground and to the positive terminal of source 32.

The output circuit further includes an integration network 34 connected across load resistors 40 and 40'. It includes resistor 35 and capacitor 36 connected in series across resistor 40 and resistor 35' and capacitor 36' connected in series across resistor 40'. In practice, the integration time constant, which is the resistance-capacitance product for resistor 35 and capacitor 36 and also the like resistance-capacitance product for the resistor 35' and the capacitor 36, is chosen as if network 34 were the initial stage of smoothing filter 37, since a conventionally designed filter is adequate for integrating these pulses.

Connected across integration network 34 between the balancing terminals is the smoothing filter 37, illustratively comprising the resistor 38 and capacitor 39 connected in series. More complex smoothing filters would typically be used and would provide a smoother analog output signal, as obtained illustratively across the capacitor 39.

Contacts 25, 26 and 27 are made like the contacts disclosed in the copending patent application of M. Shoji, Ser. No. 613,205, filed Feb. 1, 1967, and assigned to the assignee hereof; nevertheless, the following relationships are observed.

If $R_0$ is the positive overall resistance of the traveling domain device 21, $R_D$ the effective resistance across the traveling domain, $R_c$ the resistance of each of contacts,

25, 26 and 27 for a current flowing through them around the domain, and $R_L$ the resistance of resistor 40, then $$R_D > R_c >> R_o \quad (1)$$

$$R_c >> R_L \quad (2)$$

where the double inequality sign signifies more than an order of magnitude difference in value.

Figure 2A:
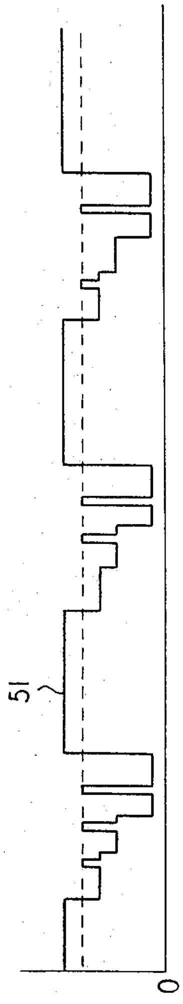
FIGS. 2A through 2D show curves which are useful in understanding the operation of the embodiment of FIG. 1.
Figure 2B:
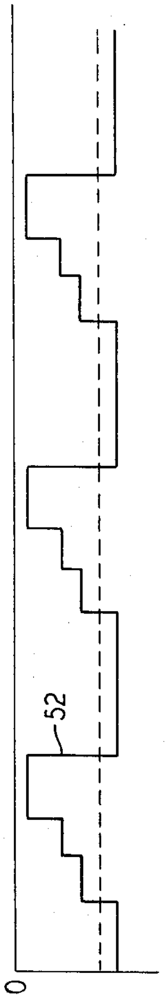

In the operation of the embodiment of FIG. 1, the succession of digital information bits is typically received as pulses having widths greater than the transit time of a traveling domain in devices 21 and 21'. The pulse train is transduced and is propagated into delay line 12 as acoustic signals. The earliest arriving signal bit is allowed to propagate to the vicinity of the last tap 15, at which time the following second and third bits of a word are in the vicinity of taps 14 and 13, respectively. The acoustic signals in delay line 12 are transduced into electric signals at taps 13, 14 and 15 which produce sufficient voltage to reverse-bias the diodes 18, 19 and 20 if the signal at each of those taps is a "1" but not if they are "0's." Word rate generator 33, which is synchronized with the signal source by conventional means (not shown) together with biasing source 32, nucleates a traveling domain. The reverse-biasing of a diode 18, 19 and 20 permits the increased current shunted around a traveling domain by the contact resistance $R_c$ to flow through the load resistor $R_L$. This current level for the waveform 51 in FIG. 2A is indicated by the dotted line. When a diode is conducting while the domain is shunted by the corresponding contact 25, 26 or 27, the diode shunts the increased current around the load resistance through the ground connection so that the only current through the load resistor is that flowing through the domain. Thus, in curve 51 of FIG. 2, the narrow pulses represented weighted "1's" and the absence of a narrow pulse in one of these positions is a "0." The undesired broad pulse portion of this waveform appears across resistor 40 and is balanced out across resistors 40 and 40' by the reference waveform supplied across resistor 40' from device 21' as shown by curve 52 of FIG. 2B.

In other words, the traveling electric field domain in device 21 reads out the digital information bits by converting them into pulses with the desired weighting. These pulses are separated from the timing information by similar device 21'. One of the principal advantages of my invention is the great speed at which such a traveling domain can sweep out this information concerning the weighted values of the digital information bits.

Figure 2C:
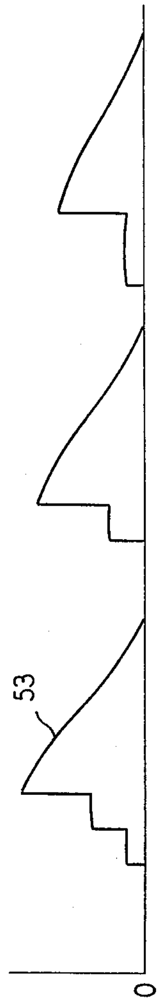
Figure 2D:
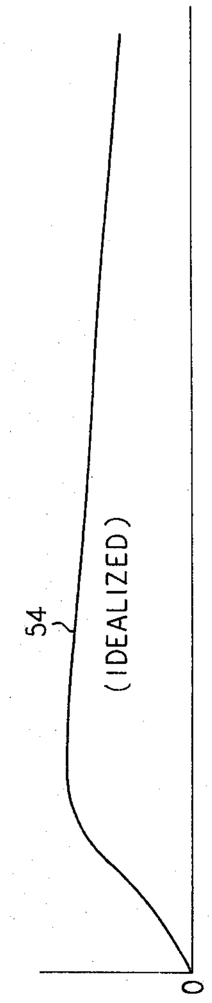

The waveform resulting from integrating the weighted pulses of each information word is shown in curve 53 of FIG. 2C and is the voltage across the output of integration network 34, although it is not necessary to consider this network separately from the consideration of filter 37, except for conceptual reasons. The ultimate smoothed analog output voltage of the apparatus is shown in curve 54 of FIG. 2D.

Figure 3:
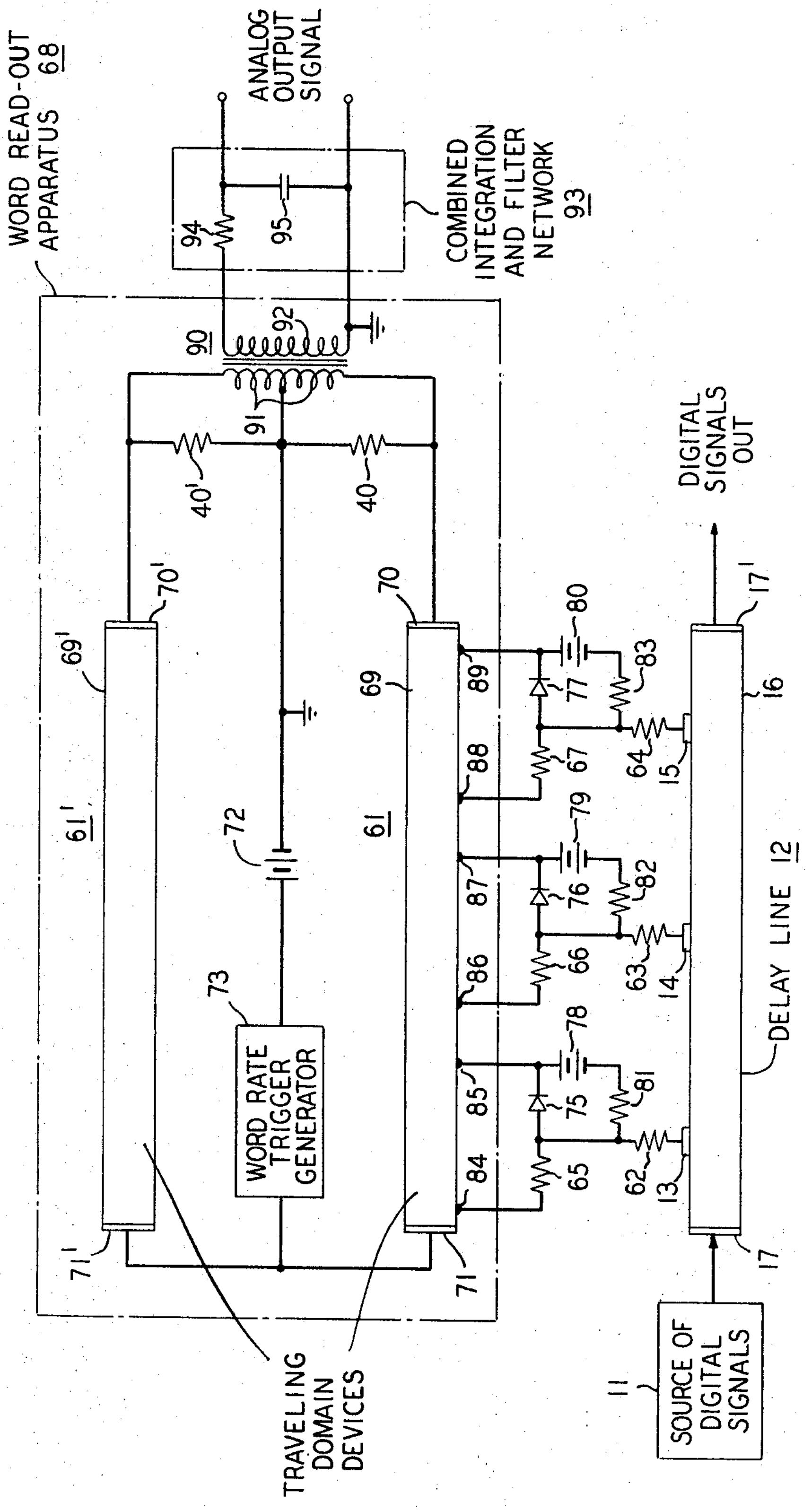
FIG. 3 is a partially pictorial and schematic and partially block diagrammatic illustration of a second embodiment of my invention employing weighting resistors.

In the embodiment of FIG. 3, components like those of FIG. 1 are numbered the same.

In FIG. 3 ohmic contacts in pairs 84–85, 86–87 and 88–89 replace the resistive broad-area contacts 25, 26 and 27 in acting as connections through which current can be shunted around the traveling electric field domain in devices 61 and 61'. The shunting effect for each bit position in a digital information word is weighted by resistors 65, 66 and 67, illustratively having value ratios of $2^n$ . . . 4:2:1, in an order starting at anode 71, assuming there are $n$ of them. The diodes 75, 76 and 77 are normally reverse-biased by series circuits including batteries 78, 79 and 80, respectively, and series resistors 81, 82, and 83, respectively. Resistors 62, 63 and 64 complete the signal paths from taps 13, 14 and 15, respectively. Each diode, such as diode 76, is forward-biased by the voltage change in crystal 16 when a digital information pulse is coupled to the corresponding tap, such as tap 13. As a result, pulses shown in FIGS. 5A through 5D are read out with each passage of the traveling electric field domain. Note that the domain can propagate in either direction with respect to propagation in delay line 12, and produce the curves shown if it propagates past the shunt resistances in the order indicated. Of course, the result of integration and filtering remains the same, regardless of the order of the weighted pulses in each broad time slot of FIG. 5A.

It should also be noted that output circuit ground isolation can be achieved by a pulse transformer 90.

In other respects, the arrangement and operation of the embodiment of FIG. 3 is like that of the embodiment of FIG. 1.

Figure 4:
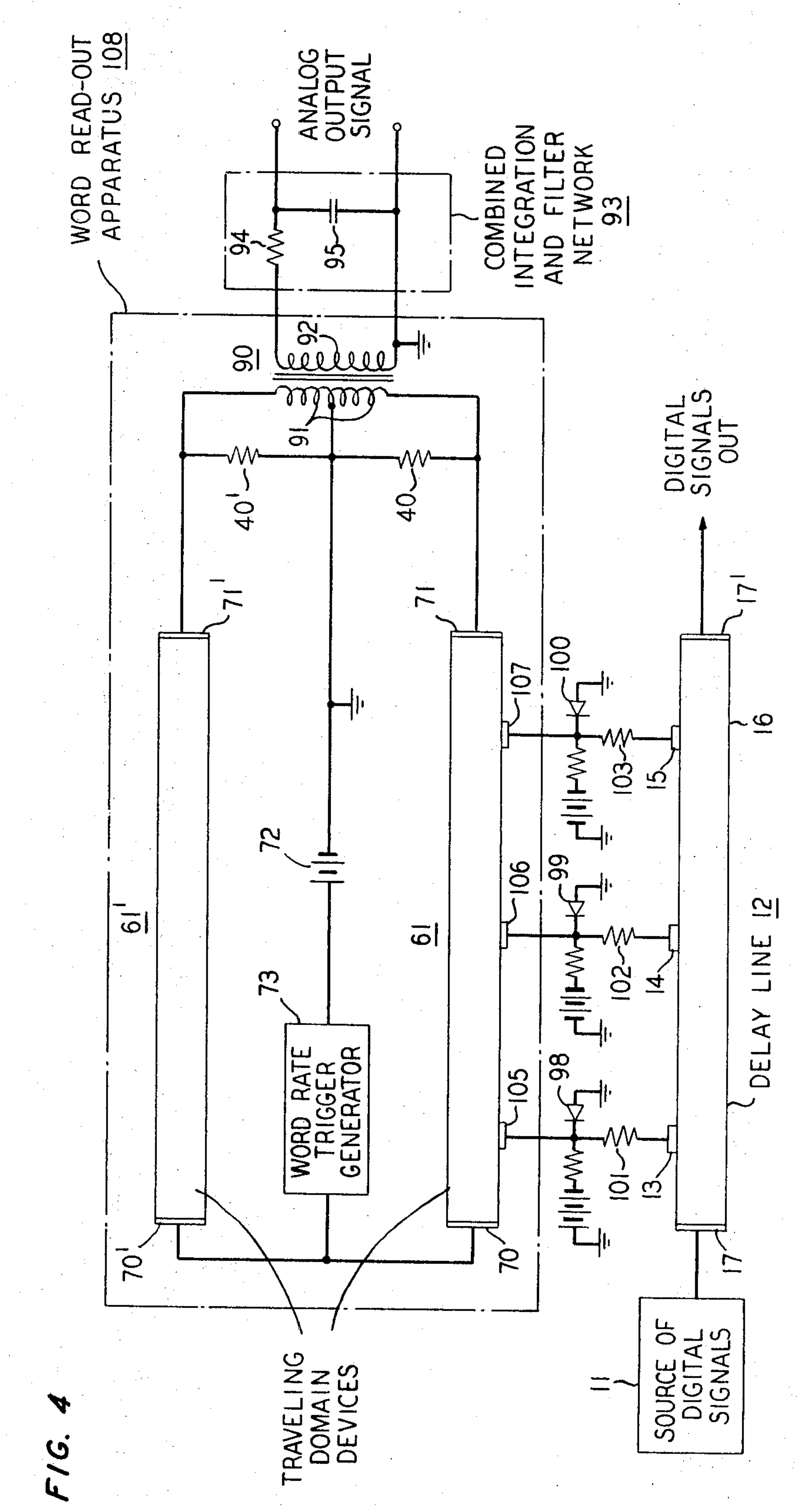
FIG. 4 is a partially pictorial and partially block diagrammatic illustration of a modification of the embodiment of FIG. 3.

In the modified embodiment of FIG. 4, components like those of FIG. 1 or FIG. 2 are numbered the same.

It is readily apparent that the sole difference between the embodiments of FIG. 4 and FIG. 3 is that the relative weighting of the respective digital information bits comprising a word is achieved by appropriate variation of the contact resistance, $R_c$, of the resistive contacts 105, 106 and 107. In all other respects the arrangement and operation of the embodiment of FIG. 4 is like that of FIG. 2.

In the preceding embodiments, it should be apparent that the particular weighting ratio employed is dependent upon the particular coding scheme, which can be any of a great number of prior art coding schemes. It should further be apparent that the principles of operation are directly applicable to arrangements employing magnetic domain wall devices with the modification that the nucleating and propagating fields are magnetic in nature and the signals may be either magnetic or optical in nature, as transmitted through the respective signal paths. For example, one such technique for weakening or strengthening magnetic domains or domain walls is found in the copending patent application of R. C. LeCraw et al., Ser. No. 629,993, filed Apr. 11, 1967, and assigned to the assignee hereof.

It should be equally apparent that there are numerous other modifications that are within the scope of my teaching and which should be apparent to those skilled in either of the arts of digital logic devices or propagating domain devices.

For example, to compensate for the accumulating signal losses resulting from matching the delay line taps to the delay line (as is desirable to avoid reflected signal interference in the delay line), the delay line may be split into segments separated by matched signal-splitting networks and even active circuits, if desired. Various alternating-current coupled signal paths, including versions employing intermediate-frequency signals, are feasible if the duty cycle of the pulses is sufficiently small and if they are pulses of a higher frequency carrier wave. Optical coupling to photosensitive resistive contacts on the traveling domain device is also feasible and would provide bandwidth compression of the optical pulses.

I claim:

1. A digital-to-analog converter comprising
means including a plurality of output signal paths for temporarily storing digital information bits forming a word and then directing said bits substantially simultaneously through respective ones of said output paths, and
means for reading out amplitude-modulated pulses responsive to said bits and integrating said amplitude-modulated pulses, including
a body of material in which electric field domains can be propagated,
means for coupling said plurality of signal paths to said body, said coupling means enabling said bits to shunt current around a domain propagating in said body in proximity to said coupling means,
said body and said coupling means being mutually adapted to weight differently the current-shunting effects of bits in respective ones of said paths, and
means for nucleating and propagating a domain through said body.

2. A digital-to-analog converter according to claim 1 in which
the body of material is a multiple-valley semiconductive material in which predominantly electric field domains can be propagated,
the means for nucleating and propagating a domain through said body includes
means for biasing said body with a voltage to promote current flow therethrough and
means for pulsing at least a component of said voltage to nucleate a domain, and the reading-out and integrating means includes
a resistive-capacitive network coupled to said body and adapted to integrate the instantaneous current flow through said body.

3. A digital-to-analog converter according to claim 2 in which the coupling means include contacts on said body resistances associated with said contacts, said body and said coupling means being mutually adapted in that said resistances are proportioned for weighting the respective digital information bits of a word.

4. A digital-to-analog converter according to claim 2 in which the body of material possesses a plurality of portions of differing properties in the regions of the couplings of the signal paths, said body and said coupling means being mutually adapted in that said differing properties being adapted to affect the resistance of the propagating domain in the vicinities of respective coupling means and thereby to affect the value of the current flow to the resistive-capacitive network in proportion to a predetermined weighting for the digital information bits in the respective signal paths.

5. A digital-to-analog converter according to claim 4 in which the respective portions of the body of material have differing cross-sectional area in direct proportion to the predetermined weighting.

6. A digital-to-analog converter according to claim 1 in which the body of material includes a plurality of portions of differing properties in the regions of the respective coupling to the signal paths, said body and said coupling means being mutually adapted in that said differing properties are proportioned to affect the propagating domain in each of said portions in direct relation to a predetermined weighting for the respective digital information bits of a word.

7. A digital-to-analog converter according to claim 1 in which
the means for temporarily storing digital information bits comprises
a delay line having a plurality of output taps at spaced positions therealong, said taps forming portions of respective ones of the output signal paths, the coupling means includes
contacts on the body and
resistances associated with said contacts,
said body and said coupling means being mutually adapted in that said resistances are proportioned to provide a predetermined weighting for the respective digital information bits of a word, the body of material in which the electromagnetic field domains can be propagated comprises
a body of a multiple-valley semiconductive material in which predominantly electric field domains can be propagated,
the means for nucleating and propagating a domain through said body includes
means for biasing said body with a voltage to promote current flow therethrough, and
means for pulsing at least a component of said voltage to nucleate a domain,
the reading out and integrating means includes a network coupled to said body and adapted to integrate and filter the instantaneous current flow through said body.

8. A digital-to-analog converter according to claim 7 including a second body of material in which electric field domains can be propagated, and means for coupling said second body in a balanced fashion with respect to the first body between the biasing and pulsing means and the integrating and filtering network.

References Cited

UNITED STATES PATENTS 3,452,222 6/1969 Masakazu Sholl ---- 317—234 X

MAYNARD R. WILBUR, Primary Examiner

C. D. MILLER, Assistant Examiner

U.S. Cl. X.R.

317—234